Oct. 11, 1960 L. A. MACKLANBURG 2,955,728
CALKING LOAD EJECTOR CUP
Filed March 4, 1958
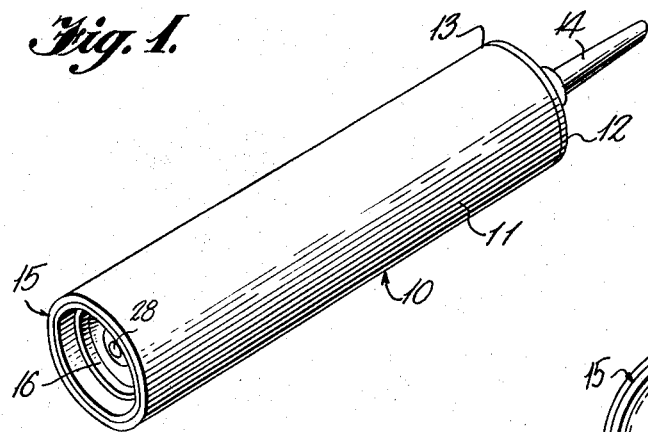
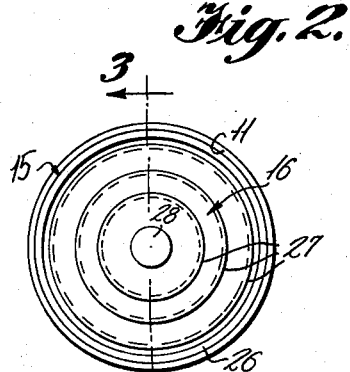
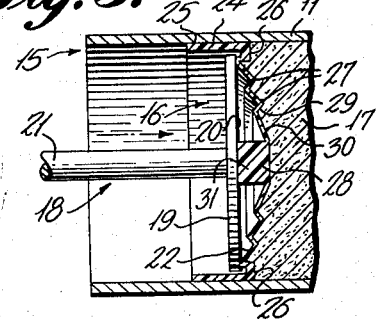
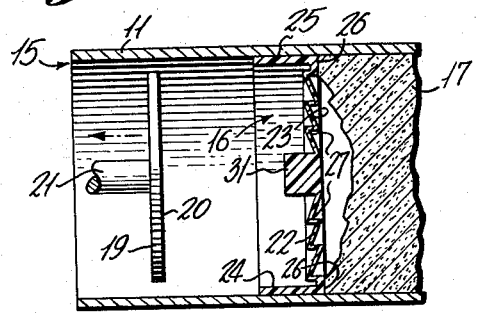
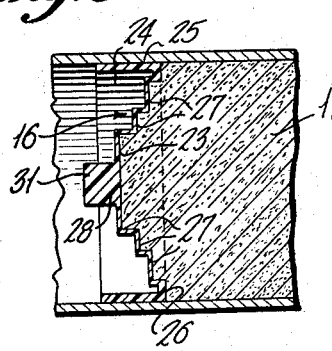
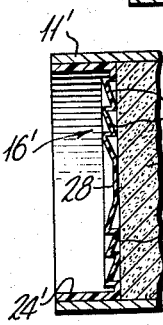
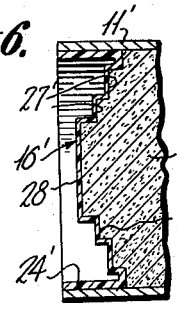
INVENTOR
Louis A. Macklanburg
BY Mason, Fenwick & Lawrence
ATTORNEYS United States Patent Office 2,955,728
Patented Oct. 11, 1960

2,955,728
CALKING LOAD EJECTOR CUP
Louis A. Macklanburg, Box 1197, Oklahoma City, Okla.
Filed Mar. 4, 1958, Ser. No. 719,035
2 Claims. (Cl. 222—386.5)

The present invention relates in general to dispensers for plastic compositions such as calking compound and the like, and more particularly to removable cartridge loads for calking guns.

Numerous devices have been designed to facilitate application of calking compound and like highly viscous, plastic materials to joints and other areas to be sealed or filled. Devices known as calking guns have been available for many years to the building trades to facilitate the proper application of calking compound over the extensive areas to which calking compound must be applied on building structures. Many of such calking guns included a large cylinder or receptacle for the calking compound, which terminated at the discharge end in an elongated, constricted discharge nozzle, and at the other end in a handle. A piston conforming substantially to the interior diameter of the calking cylinder was disposed within the cylinder for axial movement along the cylinder and a piston rod projected through the handle end of the cylinder and was shiftable axially in small increments of movement under control of a grip lever or trigger incorporated in the handle to advance the piston toward the discharge end of the cylinder in controlled small increments of movement. The control of the piston rod by means of the grip lever or trigger was usually achieved by providing ratchet teeth on the piston rod and a pawl on the grip lever.

Because of the difficulties and inconvenience involved in reloading calking guns with fixed cylinders from bulk quantities of calking compound, removable load calking guns have been available for many years wherein the calking gun essentially consists of the handle, the grip lever or trigger, the piston and piston rod controlled by the grip lever, and a supporting frame for receiving a removable, cylindrical calking load cartridge in proper axial alignment with the piston and piston rod so as to permit the piston to be advanced into the rear end of the removable cartridge. Such units may have a discharge nozzle mounted on the gun or they may have an annular abutment at the end of the cartridge supporting frame remote from the handle to permit a discharge nozzle formed on the removable load cartridge by the load cartridge supplier to project through the annular abutment. Such load cartridges are conventionally formed of cylindrical cardboard tubes having an annular metallic cap member at the discharge end peripherally sealed to the cardboard tubing by bead joints or the like and a central aperture which is closed by a removable cup shaped metallic stopper or through which a plastic discharge nozzle supported by the cap member projects. A frangible cellophane or like plastic disk is usually formed over the inwardly disposed surface of the cap member to resist accidental discharge of the calking compound and to protect the compound against exposure to atmosphere. The opposite end of the load cartridge is normally closed by a cup-shaped metallic ejector cup or piston follower having an annular peripheral flange extending away from the discharge end of the cartridge. The peripheral flange of the ejector cup closely fits with the inner walls of the cylindrical tube to frictionally hold the ejector cup in place but may slide along the wall of the tube under the force of the calking gun piston when the piston advances into contact with the circular, disk-like wall of the ejector cup.

It should be noted that the peripherally flanged metallic ejector cups of the type just described are the only thing which holds the calking compound within the load cartridges of this type. One of the big difficulties that has been encountered in connection with these calking load cartridges is that changes in temperature have a tendency to cause the calking compound within the cartridge to contract and expand when the loads are stored on the dealer's shelf and are subjected to variations in ambient temperature. With a rigid type of ejector cup of this construction, quite often the calking compound expands to the point where it will push the ejector cup entirely out the back of the load cartridge.

Also, since the calking compound is a highly viscous composition necessitating a substantial pressure on the composition by the calking gun piston to force it from the calking gun nozzle, the calking compound in the cartridge is slightly compressed during the period when it is being forced through the dispensing nozzle. When discharging pressure of the calking gun piston is released to terminate discharge of the calking compound from the nozzle, the calking compound will tend to expand. The sliding fit between the peripheral flange of the rigid ejector cup and the wall of the cartridge tube was made very tight to prevent leakage between these surfaces. Therefore, the expanding calking compound, following release of discharge pressure, had a tendency to seep from the discharge nozzle of the calking gun when the gun was laid aside since it was not able to move the ejector cup rearwardly.

An object of the present invention, therefore, is the provision of a novel calking load cartridge or like container for plastic compounds having an ejector cup which seals the rear end of the cartridge remote from the discharge end and which is deformable to minimize loss of calking compound during nonuse.

Another object of the present invention is the provision of a calking load cartridge or like plastic dispenser having an ejector cup normally sealing the rear end of the cartridge during storage which is readily deformable in a direction away from the discharge nozzle to accommodate expansion of the calking compound therein in response to temperature variations and minimize dislodging of the ejector cup from the cartridge in response to expansion of the compound.

Another object of the present invention is the provision of a novel ejector cup in the rear end of a calking load cartridge which is readily deformable in a direction away from the discharge end under pressure arising from thermal expansion of the calking compound or expansion thereof upon release of piston pressure to minimize undesired discharge of compound from the cartridge, and which cup is relatively more resistant to deformation in a direction toward the discharge nozzle.

Other objects, advantages and capabilities of the present invention will become apparent from the following detail description, taken in conjunction with the accompanying drawing illustrating two preferred forms of the invention.

In the drawing:

Figure 1 is a perspective view of a calking load cartridge embodying the present invention;

Figure 2 is an end elevation of the calking load cartridge taken from the end thereof remote from the discharge nozzle and illustrating the ejector cup in elevation;

Figure 3 is a fragmentary vertical longitudinal section view through the rear portion of the calking load cartridge and ejector cup, taken from the position indicated by the line 3—3 of Figure 2 and illustrating the condition of the ejector cup when it is being forced toward the discharge nozzle by a calking gun piston;

Figure 4 is a fragmentary vertical longitudinal section view taken from the same position as Figure 3, but illustrating the condition of the ejector cup immediately following withdrawal of the calking gun piston from contact therewith and prior to expansion of the calking compound;

Figure 5 is a fragmentary section view similar to Figures 3 and 4, but illustrating the ejector cup in deformed condition in response to expansion of the calking compound;

Figure 6 is a fragmentary vertical longitudinal section view of a modified form of ejector cup embodying the present invention, illustrating the same in the position assumed when the calking gun piston is forcing the cup toward the discharge nozzle; and Figure 7 is a fragmentary section view similar to Figure 6, illustrating the condition of the ejector cup when it is deformed in response to expansion of the calking compound.

Referring to the drawing, wherein like reference characters designate corresponding parts throughout the several figures and particularly to the form of invention illustrated in Figures 1 to 5 inclusive, the calking load cartridge, generally indicated by the reference character 10, includes an elongated cylindrical tube 11 of cardboard or similar material, having a cap member 12 closing the discharge end thereof joined to the adjacent edge of the tube 11 by a secure bead joint 13 providing fluid tight seal therebetween. In the form illustrated in Figure 1, a discharge nozzle 14 projects centrally from the cap member 12, but it will be understood that such a discharge nozzle 14 will not be supplied by the manufacturer on the removable calking load cartridges for guns having fixed discharge nozzles thereon, in which case the discharge aperture in the cap member 12 will be closed by a cup shaped metallic closure cap or like closure facility.

The rear end of the tube 11, which is indicated generally by the reference character 15 is provided with a calking load cup, generally indicated by the reference character 16, of novel construction, which forms a sliding closure for the rear end of the tube 11 and is adapted to be forced toward the discharge end of the tube 11 to discharge the calking compound or other contents, indicated by the reference character 17, by the piston 18 of the calking gun. The piston 18, in accordance with conventional practice, comprises an enlarged disk-shaped piston head 19 having a flat forward working face 20 which is of slightly smaller diameter than the inner diameter of the tube 11, and a piston rod 21 of circular cross-section having ratchet teeth (not shown) along the rearward portion of the piston rod 21 disposed in one radial direction from the axis of the rod 21 to normally coact with a pawl or advancing tooth on or controlled by the grip lever or trigger of the calking gun in a known manner to advance the piston toward the discharge end of the cartridge.

The calking load ejector cup 16 is of unitary one piece construction molded by suitable dies from a heavy flexible plastic material, such for example as vinyl or polyethylene.

The ejector cup 16 comprises a circular disk-like, closure wall 22 having a forward face 23 forming the working face of the ejector cup which bears against the calking compound 17 and an integral, rearwardly projecting peripheral flange 24 forming cylindrical outer surface 25 of a diameter conforming to the inner diameter of the tube 11 to provide a tight sliding fit with the inner wall of the tube 11. The fit between the surface 25 of the flange 24 and the wall of the tube 11 is such that sufficient friction is provided to normally hold the ejector cup in position within the tube 11 to seal the rear end 15 of the cartridge 10 but to permit sliding movement of the ejector cup 16 inwardly axially of the tube 11 in response to the force of the piston 18.

The flange 24 and the annular border portion 26 of the disk-like wall 22 bounding the periphery of the disk-like wall 22 are relatively thick to resist resilient deformation of these portions of the ejector cup 16. The major part of the disk-like wall 22 of the ejector cup 16 is occupied by a plurality of concentric annular accordion pleatings or pleating rings 27 surrounding and concentric with a central region 28, the portion of the plastic material forming the pleating rings 27 being considerably thicker than the border portion 26 or peripheral flange 24 to provide substantial flexibility in this region of the ejector cup 16. The pleating rings 27 are of rearwardly converging, distorted V-shaped cross-section having a short side 29 which normally lies in a cylindrical path co-axial with the axis of the tube 11 and cup 16 and a long side 30 which normally lies at a large angle to the axis of the tube 11, all as illustrated in Figure 4.

In the embodiment shown in Figures 2 to 5, an integral, short cylindrical stud or post 31 projects rearwardly for a selected distance from the central zone 28 of the ejector cup 16, to be engaged by the central portion of the front face 20 of the piston head 19 to cause the central zone 28 to be flexed toward the discharge end of the cartridge 10. Referring to Figure 3, it will be observed that the flat forward face 20 of the piston head 19 engages the rear surface of the stud 31 and forces the central zone 28 forwardly until the peripheral portions of the piston face 20 abut the apex of the outermost annular pleating ring 27 immediately adjoining the border portion 26 of the cup 16. It being understood that the piston 18 is advanced only in short increments as required to discharge calking compound from the nozzle 14, the piston 18 will be rotated to disengage its ratchet teeth from the pawl of the grip lever when it is desired to set the calking gun aside for a considerable period and the piston will be withdrawn slightly from contact with the ejector cup 16 as is illustrated in Figure 4. Upon withdrawal of the piston head 19 from contact with the ejector cup, the inherent resiliency in the flexible plastic material making up the ejector cup 16 and the spring effect of the pleating rings 27 resulting from their tendency to return to normal condition following deformation during the advancing stroke by the piston coact to return the disk-like wall 22 of the ejector cup 16 to its normal position lying generally perpendicular to the axis of the tube 11. This creates a slight suction within the cartridge tube 11 which has a tendency to pull the calking compound rearwardly away from the nozzle end of the cartridge and stop the flow of calking compound immediately when the piston pressure is released. It should be noted that this results from the response of the ejector cup 16 to the resilient return biasing forces set up within the pleating rings 27 of the cup 16 when it is deformed forwardly under the force of the piston.

Because of the fact that the pleating rings 27 are of V-shaped cross-section converging rearwardly of the tube 11 and have their short side 29 disposed relatively remote from the axis of the tube 11 as compared with their long side 30, the disk-like wall 22 of the cup 16 strongly resists deformation toward the discharge end of the tube 11. However, this same relative location of the short and long sides 29 and 30 permits the central zone 28 of the disk-like wall 22 to be deformed rearwardly of the tube 11 under very light pressure by the calking compound 17. This provides great protection against loss of compound through seepage from the discharge nozzle 14 when the calking gun has been laid aside for extensive periods and thermal or other variations cause expansion of the compound, as the portion of the disk-like wall 22 of the ejector cup 16 occupied by the pleating rings 27 will readily expand rearwardly to the position illustrated in Figure 5 in response to expanding pressures within the body of calking compound 17 to increase the effective volume of the load chamber within the tube 11. The resiliency of the deformable wall portion of the ejector cup 16 is suitably adjusted by selection of the thickness of this portion, the dimensions of the pleating ring sides, and the nature of the plastic material so that it responds to less pressure than would be required to extrude calking compound from the nozzle 14 so that accidental seepage of calking compound is eliminated.

This same action of the ejector cup 16 under expanding pressure of the calking compound also effectively protects the calking load cartridges 10 from accidental dislodgment of the ejector cup while the cartridges are stored on the dealer's shelf. The cartridges 10 when stored on the dealer's shelf usually have a plastic membrane of cellophane or like material formed within the tube 10 at the discharge end thereof which prevents discharge of the calking compound through the load nozzle 14 until the membrane is broken by piston pressure on the ejector cup. In the forms of cartridge loads which dispense with the nozzle 14 the discharge opening in the cap member 12 is closed by a metallic closure member. Thus, under either of the circumstances, thermal expansion of the calking compound does not produce any seepage through the discharge end of the cartridge and such expansion normally forces the ejector cup rearwardly of the tube 11. As previously explained, this expansion is sometimes severe enough to force the cup entirely out of the tube 11. When the ejector cup 16 is used, however, the pleating rings 27 permit sufficient expansion of the capacity of the load chamber occupied by the calking compound to accommodate the thermal expansion of the calking compound and avoid accidental dislodgment of the cup. This provides substantial savings in that it insures longer shelf life for the cartridge loads.

The form shown in Figures 6 and 7 is identical to that shown in Figures 2 to 5 except that the short stud or post 31 is eliminated, so that the various elements of the ejector cup 16' shown in Figures 6 and 7 carry the primes of the reference characters designating corresponding parts in the form of Figures 2 to 5. Due to the absence of the stud 31 in the ejector cup 16', the disk-like closure wall 22' will not be deformed forwardly on the advance stroke of the piston 18 as was the case in the form of Figures 2 to 5. However, the pleating rings 27' which permit ready deformation of the central zone 28' rearwardly of the tube 11 in response to calking compound expansion are retained, so that the ejector cup 16' effectively increases the shelf life of the load cartridge by permitting increase in the capacity of the load chamber occupied by the calking compound 17' to accommodate differences in volume resulting from normal temperature variations, and the disk-like closure wall 22' is flexible rearwardly under a sufficiently small expansive force to respond to expansion of the calking compound before the pressure becomes sufficient to extrude compound from the nozzle 14.

Thus while the form shown in Figures 2 to 5 is more effective and is preferred, the form illustrated in Figures 6 and 7 has decided advantages over the prior art.

While two specific forms of the present invention have been particularly shown and described, it is apparent that various modifications may be made in the invention without departing from the spirit and scope thereof, and it is desired, therefore, that only such limitations shall be placed thereon as are imposed by the prior art and are set forth in the appended claims.

What is claimed is:

1. A cartridge for use in dispensing calking compound and the like adapted to be acted upon by an axially reciprocative piston having a flat working surface, the cartridge comprising an elongated cylindrical tube having front and rear ends, a cap member for the front end of the tube having a discharge port therein, and an ejector cup for sealing the rear end of the tube and serving as a piston follower for forceably discharging the contents of the tube through the discharge port, said ejector cup comprising a body molded from plastic material including a closure wall of circular configuration lying transversely of the cylindrical tube and a rearwardly projecting annular peripheral flange, said flange being an uninterrupted annulus of plastic material which is relatively thicker than said closure wall to resist distortion and is configurated to provide a tight sliding fit with the interior walls of the cylindrical tube to form a seal against pasage of the contents between the flange and said interior walls and permit axial movement of the cup along the cylindrical tube, and said closure wall being a relatively thin web of plastic material integral with the flange and having an initial and normal unstressed position lying generally perpendicular to the axis of the cylinder in alignment with a forward edge of the peripheral flange, and said closure wall having a centrally disposed rearwardly projecting integral post and a plurality of accordion pleating rings formed concentric with said post to render the central region of the closure wall flexibly displaceable axially of said cylindrical tube, said pleating rings being configurated to render the central region of the closure wall readily flexible rearwardly of the tube to a rearwardly bowed, stressed condition in response to pressure on the surface of the closure wall facing forwardly of the tube to accommodate expansion of the volume of the contents without axial translation of the ejector cup, and said post being of a length axially of the tube to be engaged by the working surface of the piston upon movement thereof toward the front end of the tube to effect flexible distortion of the central region of said closure wall toward the front end of the tube to a forwardly bowed, stressed condition, and said pleating rings and the elastic memory of said closure wall coacting to return said base portion to said normal unstressed position upon withdrawal of the piston from contact with said post to create suction forces tending to pull the calking compound rearwardly away from the discharge port.

2. A cartridge for use in dispensing calking compound and the like adapted to be acted upon by an axially reciprocative piston, the cartridge comprising an elongated cylindrical tube having front and rear ends, a cap member for the front end of the tube having a discharge port therein, and an ejector cup for sealing the rear end of the tube and serving as a piston follower for forceably discharging the contents of the tube through the discharge port, said ejector cup comprising a body molded from plastic material including a closure wall of circular configuration lying transversely of the cylindrical tube and a rearwardly projecting annular peripheral flange, said flange being an uninterrupted annulus of plastic material which is relatively thicker than said closure wall to resist distortion and is configurated to provide a tight sliding fit with the interior walls of the cylindrical tube to form a seal against passage of the contents between the flange and said interior walls and permit axial movement of the cup along the cylindrical tube, and said closure wall being a relatively thin web of plastic material integral with the flange and having an initial and normal unstressed position lying generally perpendicular to the axis of the cylinder in alignment with a forward edge of the peripheral flange, and said closure wall having a centrally disposed rerawardly projecting integral post and a plurality of accordion pleating rings formed concentric with said post, said rings being V-shaped in cross-section wherein the sides of the V are unequal in length to render the central region of the closure wall readily flexibly displaceable axially of the cylindrical tube toward the rear of the tube to a rearwardly bowed, stressed condition in response to pressure from the contents to accommodate enlargement of the volume of the contents without axial displacement of the ejector cup and to render the central region of the closure wall flexible to a lesser degree axially toward the front of the tube, and said post being of a length axially of the tube to be engaged by the piston upon movement thereof toward the front end of the tube to effect flexible distortion of the central region of said closure wall toward the front end of the tube to a forwardly bowed, stressed condition, and said pleating rings and the elastic memory of said closure wall coacting to return said closure wall to said normal unstressed position upon withdrawal of the piston from contact with said post to create suction forces tending to pull the calking compound rearwardly away from the discharge port.

References Cited in the file of this patent

UNITED STATES PATENTS

| | | |
|---|---|---|
| 2,111,312 | Clark | Mar. 15, 1938 |
| 2,111,582 | Crewe | Mar. 22, 1938 |
| 2,428,452 | Farmer | Oct. 7, 1947 |
| 2,571,486 | Reynolds | Oct. 16, 1951 |
| 2,833,451 | Sherbondy | May 6, 1958 |
| 2,920,797 | Sherbondy | Jan. 12, 1960 |
| 2,923,442 | Maras | Feb. 2, 1960 |